(12) United States Patent
Kim et al.

(10) Patent No.: US 9,108,536 B2
(45) Date of Patent: Aug. 18, 2015

(54) WALK-IN APPARATUS FOR VEHICLE SEAT

(75) Inventors: Eun Sue Kim, Hwaseong-si (KR);
Hyeong Jun Kim, Anyang-si (KR);
Sung Hak Hong, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 400 days.

(21) Appl. No.: 13/527,045

(22) Filed: Jun. 19, 2012

(65) Prior Publication Data

US 2013/0147250 A1 Jun. 13, 2013

(30) Foreign Application Priority Data

Dec. 12, 2011 (KR) ................. 10-2011-0133133

(51) Int. Cl.
*B60N 2/02* (2006.01)
*B60N 2/12* (2006.01)

(52) U.S. Cl.
CPC ....................................... *B60N 2/12* (2013.01)

(58) Field of Classification Search
CPC ............... B60N 2/12; B60N 2/14; B60N 2/20
USPC ............................................. 297/378.12, 341
See application file for complete search history.

(56) References Cited

U.S. PATENT DOCUMENTS

| 8,376,459 | B2* | 2/2013 | Kumazaki et al. ............ 297/341 |
| 2007/0257536 | A1* | 11/2007 | Nemoto ........................ 297/341 |
| 2010/0141007 | A1 | 6/2010 | Kienke et al. | |

FOREIGN PATENT DOCUMENTS

| JP | 59026335 A * | 2/1984 | ............... B60N 1/08 |
| KR | 10-2006-0074413 A | 7/2006 | |
| KR | 10-0785234 B1 | 12/2007 | |
| KR | 10-2013-0024625 A | 3/2013 | |
| KR | 1020130024625 A | 3/2013 | |

* cited by examiner

*Primary Examiner* — Laurie Cranmer
(74) *Attorney, Agent, or Firm* — Morgan, Lewis & Bockius LLP

(57) ABSTRACT

A walk-in apparatus for vehicle seats can be constructed of parts required to realize the walk-in operation, thus reducing the production cost and the weight of the apparatus. Moreover, apparatus can reduce the volume of the entire apparatus so that it can be easily applied even to a small-sized seat, for example, that of a small vehicle.

6 Claims, 15 Drawing Sheets

WALK-IN APPARATUS FOR VEHICLE SEAT

CROSS-REFERENCE TO RELATED APPLICATIONS

The present application claims priority of Korean Patent Application Number 10-2011-0133133 filed Dec. 12, 2011, the entire contents of which application is incorporated herein for all purposes by this reference.

BACKGROUND OF INVENTION

1. Field of Invention

The present invention relates to a walk-in apparatus for a vehicle seat which makes it possible to slide the vehicle seat forwards.

2. Description of Related Art

Vehicle seats includes a seat cushion that supports the lower body of an occupant, a seat back that supports the upper body of the occupant, and a headrest that supports his/her head and neck.

Generally, second-row seats of RVs (Recreational Vehicles) or the passenger seats of sports cars have structures capable of performing a walk-in operation whereby the entirety of a seat moves forwards to allow a passenger to get into or out of a rear seat. An apparatus for making this possible is a walk-in apparatus that is provided in the seat.

FIGS. 1 and 2 illustrate a conventional walk-in apparatus. When an occupant pulls a hand lever 1 provided on a lower portion of a side surface of a seat back, a walk-in lever 5 is rotated in the clockwise direction by the operation of a locking pin 3. Thereby, a lower tooth pin 7 is moved downwards so that a lower tooth bracket 9 that is integrally provided with the lower tooth pin 7 moves downwards, thus releasing an upper tooth bracket 11 which has engaged with the lower tooth pin 7.

Then, the seat back provided with the upper tooth bracket 11 is folded forwards by the elastic restoring force of a windup spring provided on a hinge pin 8 of the upper tooth bracket 11. In addition, the conventional apparatus is configured such that a user can adjust the angle of the seat back while overcoming the repulsive force (acting in the folding direction) of the spring.

Meanwhile, an upper rail 15 is integrally mounted to a lower surface of a cushion plate 13 of the seat. A lower rail 17 slidably supports the upper rail 15. The lower rail 17 is fastened to the floor of a vehicle body by front and rear mounting brackets 19 and 21.

The front and rear mounting brackets 19 and 21 may be respectively integrated with front and rear ends of the lower rail 17.

Furthermore, a release lever 23 which shares the locking pin 3 with the hand lever 1 is installed below the hand lever 1. The release lever 23 is connected, by a back cable 25, to a manipulation lever that is provided on an upper end of a rear surface of the seat back.

Therefore, when an occupant who sits in a rear row seat behind the seat manipulates the manipulation lever, the back cable 25 is pulled upwards, so that the release lever 23 is rotated in the counterclockwise direction. Thereby, in the same manner as the above, the walk-in lever 5 is rotated in the clockwise direction by the operation of the locking pin 3 so that the lower tooth bracket 9 and the tooth bracket 11 which have engaged with each other are released from each other, thus allowing the seat back to be folded.

Further, simultaneously with this operation, an upper lever 29 which is provided on the same axis (the hinge pin 8) with the upper tooth bracket 11 is rotated in the counterclockwise direction by folding the seat back, that is, the upper tooth bracket 11. Thereby, the walk-in cable 31 connected to the upper lever 29 is pulled, so that the locked state of a locking means provided on an inner surface of the cushion plate 13 is released, thus allowing the walk-in operation.

The walk-in operation is the operation in which the entirety of the seat moves forwards. This walk-in operation is realized by the contraction of a walk-in spring (not shown). The opposite ends of the walk-in spring are respectively connected to mounting brackets (not shown) which are mounted to the front mounting bracket 19 and the rear end of the upper rail 15. Thus, the walk-in spring is in an extended state while the seat is at a rear end position thereof. Therefore, upon the releasing operation of the locking means, the walk-in spring provides the force with which the seat moves forward.

As such, the walk-in apparatus provided in the seat makes it possible to move the seat forwards, thus providing space to allow the passenger to get into or out of the rear seat.

An exemplar of a known apparatus is described in Korean Patent Registration No. 10-0785234

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a walk-in apparatus for vehicle seats which minimizes the number of parts required to realize the walk-in operation, thus reducing the production cost and the weight of the apparatus.

Various aspects of the present invention provide for a walk-in apparatus for vehicle seats according to the present invention can be constructed only by parts required to realize the walk-in operation, thus reducing the production cost and the weight of the apparatus. Moreover, the present invention can reduce the volume of the entire apparatus so that it can be easily applied even to a small-sized seat, for example, that of a small vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
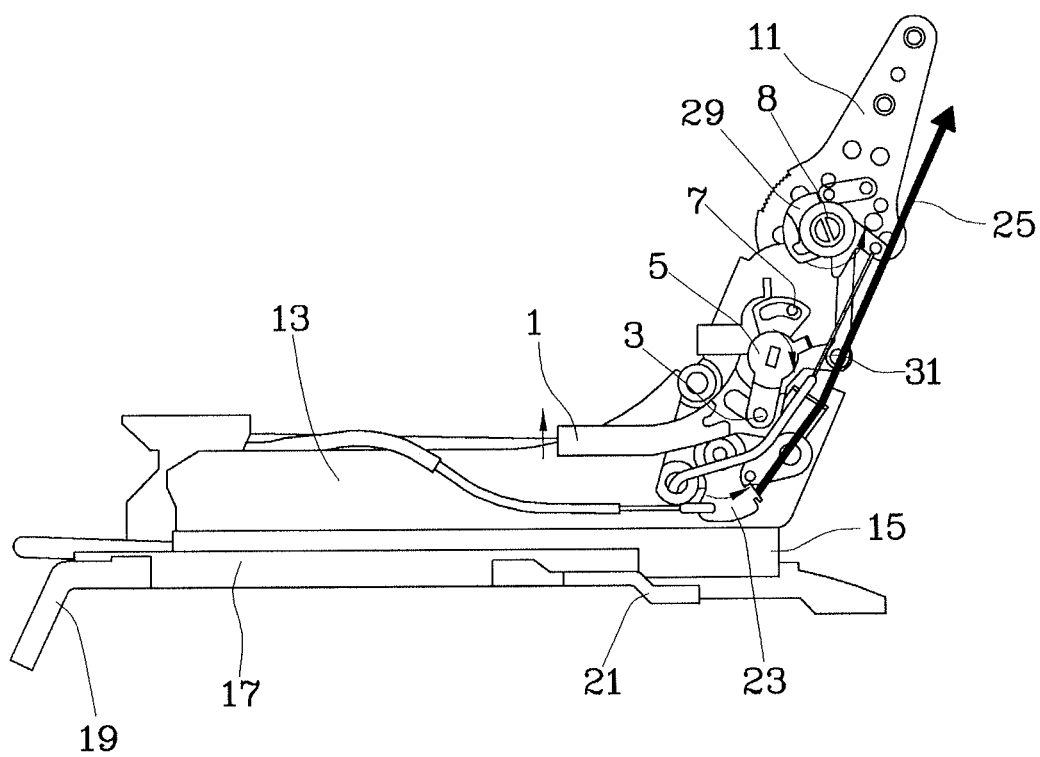
FIGS. 1 and 2 are views illustrating a conventional walk-in apparatus.
Figure 2:
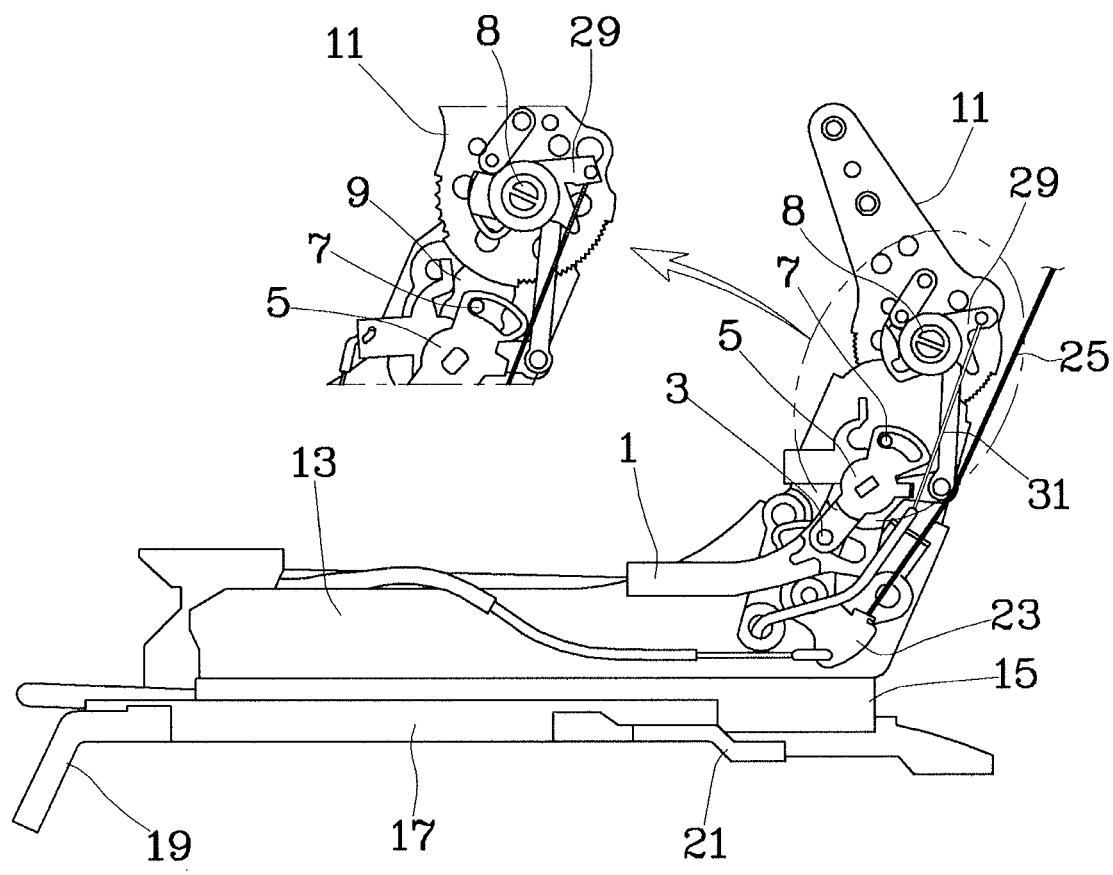

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 3 through 16, the walk-in apparatus for vehicle seats according to the present invention includes a seat cushion bracket 40, a holder tooth bracket 50, a seat back bracket 60, a link bracket 70 and a locking lever bracket 80. The seat cushion bracket 40 is mounted to a seat cushion frame 31 and a first surface of a recliner 32. The holder tooth bracket 50 is coupled to a second surface of the recliner 32. Tooth notches 51 are formed in a circumferential outer edge of the holder tooth bracket 50. The seat back bracket 60 is rotatably interposed at a first end thereof between the recliner 32 and the holder tooth bracket 50. A second end of the seat back bracket 60 is coupled to a seat back frame 33. The link bracket 70 is coupled to the seat back bracket 60 so as to be elastically rotatable. The link bracket 70 is connected to a walk-in lever 35 by a lever cable 34. The locking lever bracket 80 is rotatably coupled at a first end thereof to the seat back bracket 60. A second end of the locking lever bracket 80 is connected to the link bracket 70. Locking lever protrusions 81 are integrally provided on a peripheral edge of the locking lever bracket 80 and engage with the tooth notches 51. One will appreciate that the protrusions may be monolithically formed with the bracket.

Figure 8:
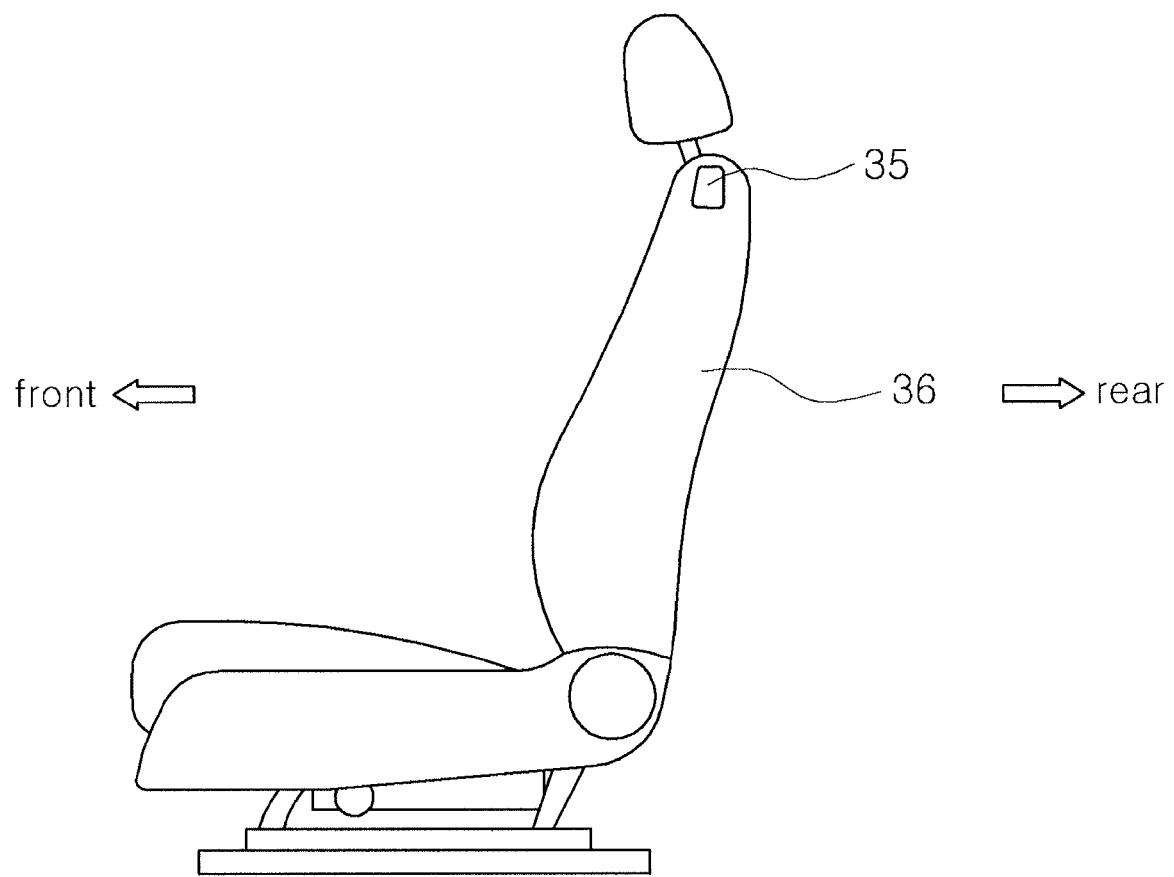

As shown in FIG. 8, in various embodiments, the walk-in lever 35 is rotatably mounted to a side surface of a seat back 36. However, the location of the walk-in lever 35 is not limited to that of the illustrated embodiment, in other words, the walk-in lever 35 can be disposed at any location on the seat, so long as it is convenient for a user to manipulate the walk-in lever 35.

For reference, a technique of a round type recliner refers to Korean Patent Registration No. 10-0923944.

Furthermore, a holder tooth protrusion 52 integrally protrudes from the holder tooth bracket 50 in a radial direction. One will appreciate that the protrusion may be monolithically formed with the bracket. A first stopper bracket 90 is fastened to a first surface of the seat cushion bracket 40 and has a first stopper protrusion 91 which protrudes toward the seat back bracket 60. A first restriction end 61 and a second restriction end 62 are integrally provided on a peripheral edge of the seat back bracket 60. One will appreciate that the ends may be monolithically formed with the bracket. The first restriction end 61 makes contact with the holder tooth protrusion 52 to restrain rearward rotation of the seat back bracket 60. The second restriction end 62 makes contact with the first stopper protrusion 91 to restrain forward rotation of the seat back bracket 60.

A second stopper bracket 110 is provided between the seat cushion bracket 40 and the seat back bracket 60. The second stopper bracket 110 is integrally coupled to the seat back bracket 60 and has a second stopper protrusion 111 which protrudes toward the seat cushion bracket 40. A third restriction end 41 and a fourth restriction end 42 are integrally provided on a peripheral edge of the seat cushion bracket 40. One will appreciate that the ends may be monolithically formed with the bracket. The third restriction end 41 makes contact with the second stopper protrusion 111 to restrain rearward rotation of the seat back bracket 60. The fourth restriction end 42 makes contact with the second stopper protrusion 111 to restrain forward rotation of the seat back bracket 60.

Figure 3:
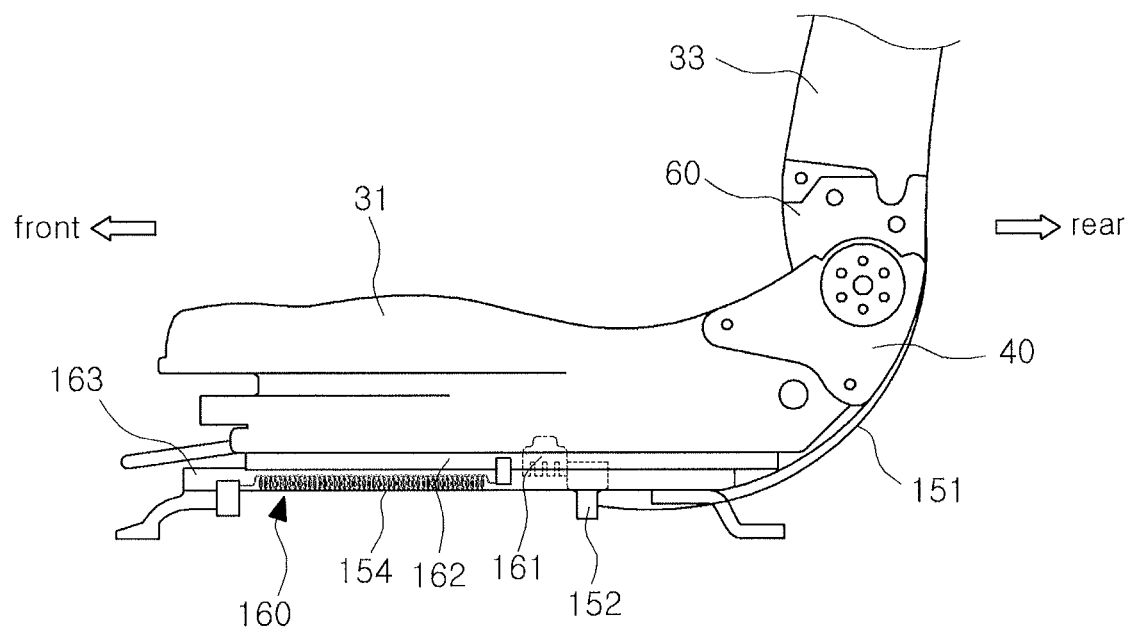
FIG. 3 is a side view of an exemplary vehicle seat having a walk-in apparatus, according to the present invention.

That is, as shown in FIG. 3, when the seat back frame 33 is oriented upright with respect to the seat cushion frame 31, the holder tooth protrusion 52 comes into contact with the first restriction end 61 and, simultaneously, the second stopper protrusion 111 comes into contact with the third restriction end 41. Such a double restriction structure restrains the rearward rotation of the seat back bracket 60.

Figure 16:
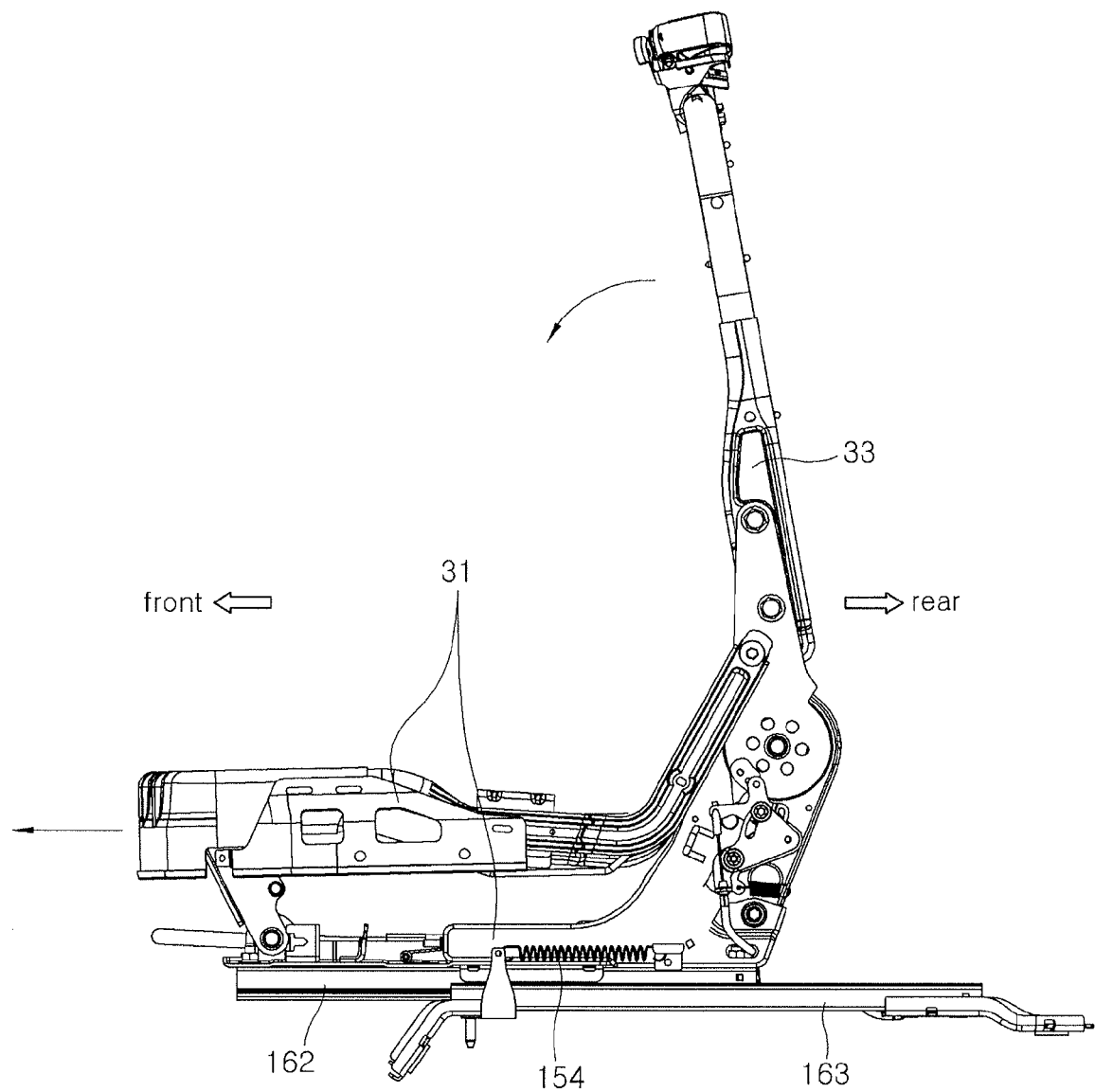

On the other hand, as shown in FIG. 16, when the seat back frame 33 has rotated forwards with respect to the seat cushion frame 31, the first stopper protrusion 91 comes into contact with the second restriction end 62 and, simultaneously, the second stopper protrusion 111 comes into contact with the fourth restriction end 42. Such a double restriction structure restrains the forward rotation of the seat back bracket 60.

The walk-in apparatus according to the present invention further includes a rotating shaft 120, a holder bracket 130 and a link spring 140. The rotating shaft 120 is fastened to the seat back bracket 60 and passes through the link bracket 70 so that the link bracket 70 is able to rotate around the rotating shaft 120. The holder bracket 130 is fastened to the seat back bracket 60 in a shape in which the holder bracket 130 overlaps the holder tooth bracket 50. A holder protrusion 131 is integrally provided on the holder bracket 130. One will appreciate that the protrusion may be monolithically formed with the bracket. The link spring 140 is wrapped around the rotating shaft 120 and is configured such that a first end thereof is supported on the link bracket 70 and a second end thereof is supported on the holder protrusion 131 so that an elastic restoring force is applied to the link bracket 70 when it has rotated.

The link bracket 70 has a shaft hole 71 through which the rotating shaft 120 passes, and an operation slot 72 in which an operation protrusion 82 provided on the locking lever bracket 80 is disposed. A cable coupling protrusion 73 and a spring coupling protrusion 74 are integrally provided on the link bracket 70 around the shaft hole 71. One will appreciate that the protrusions may be monolithically formed with the bracket. A first end of the lever cable 34 is coupled to the cable coupling protrusion 73. The first end of the link spring 140 is caught and supported by the spring coupling protrusion 74.

Figure 4:
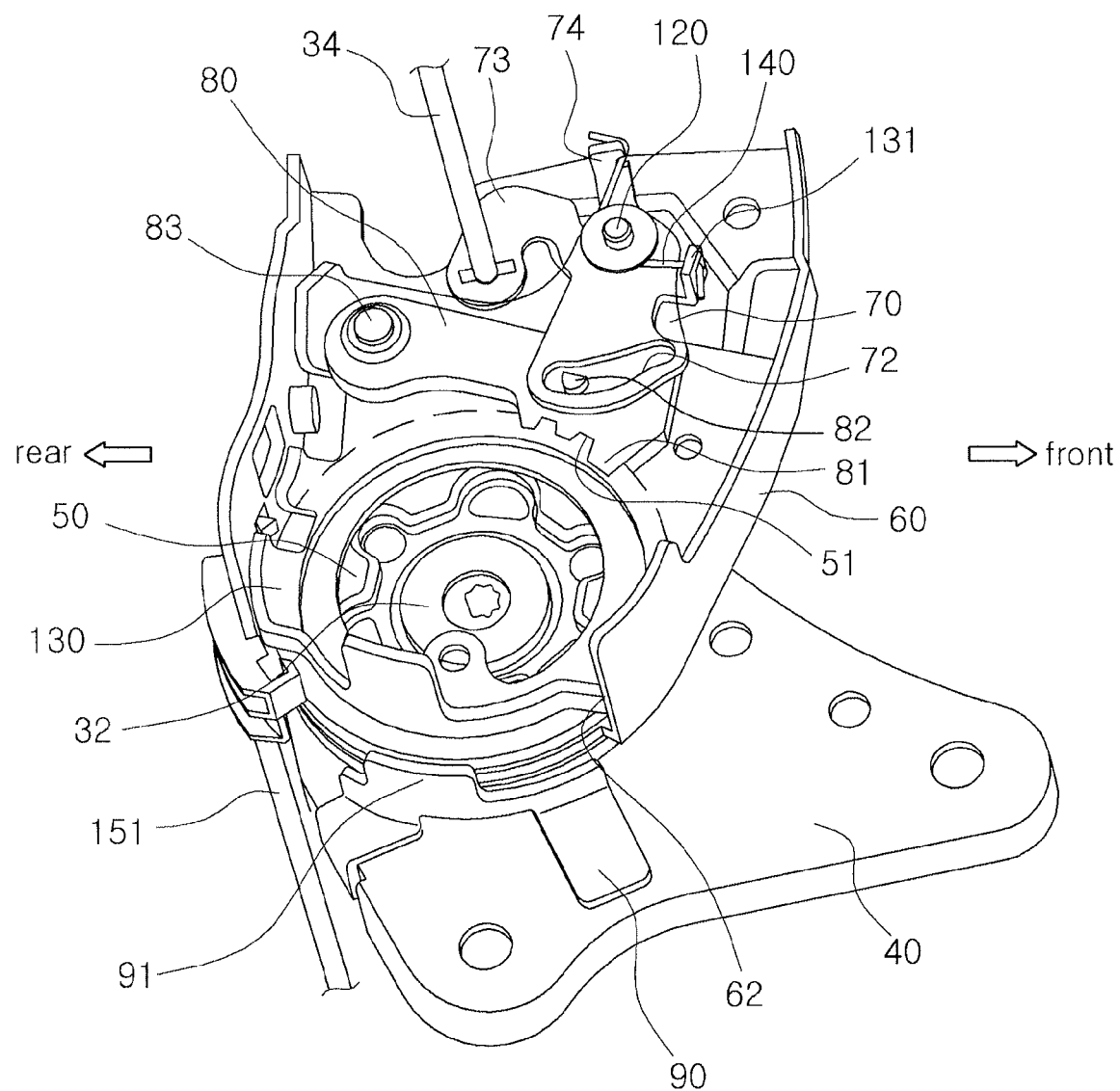
FIGS. 4 through 16 are views illustrating the construction and operation of an exemplary walk-in apparatus according to the present invention.
Figure 5:
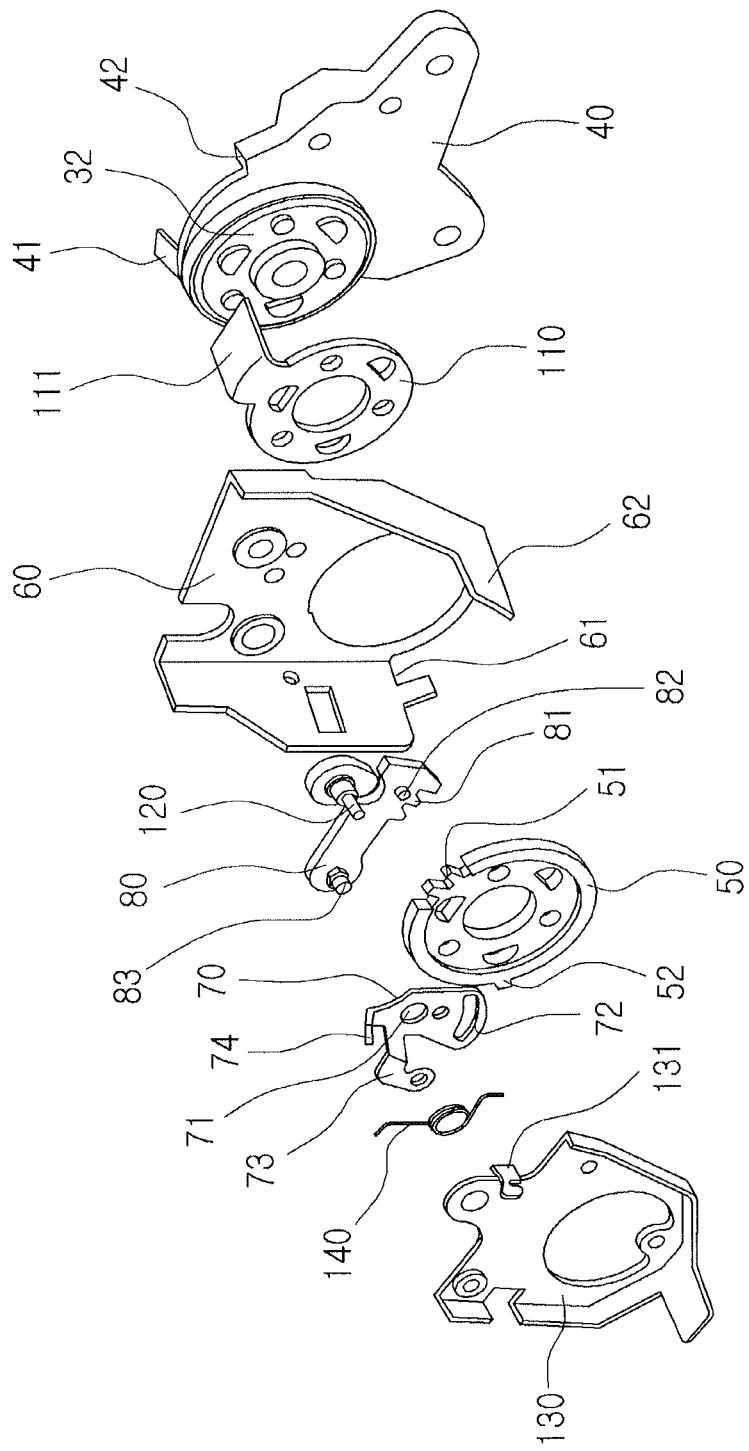
Figure 6:
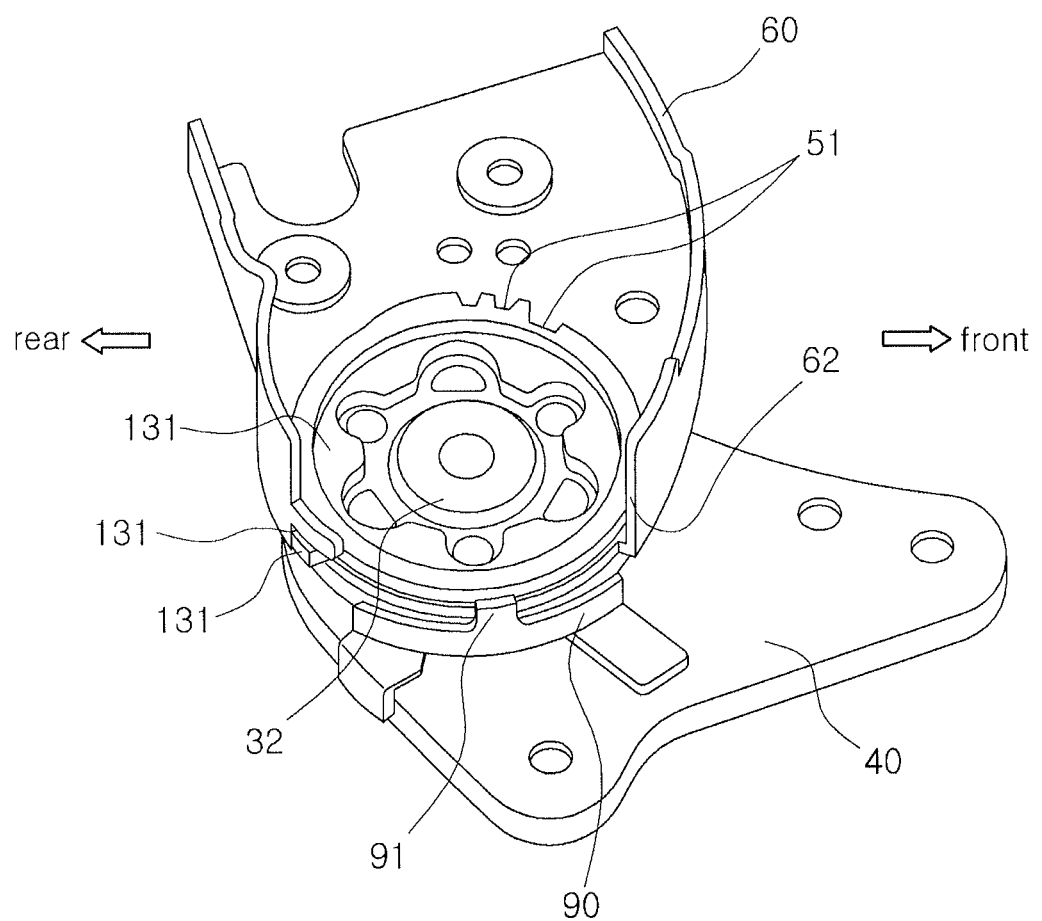
Figure 7:
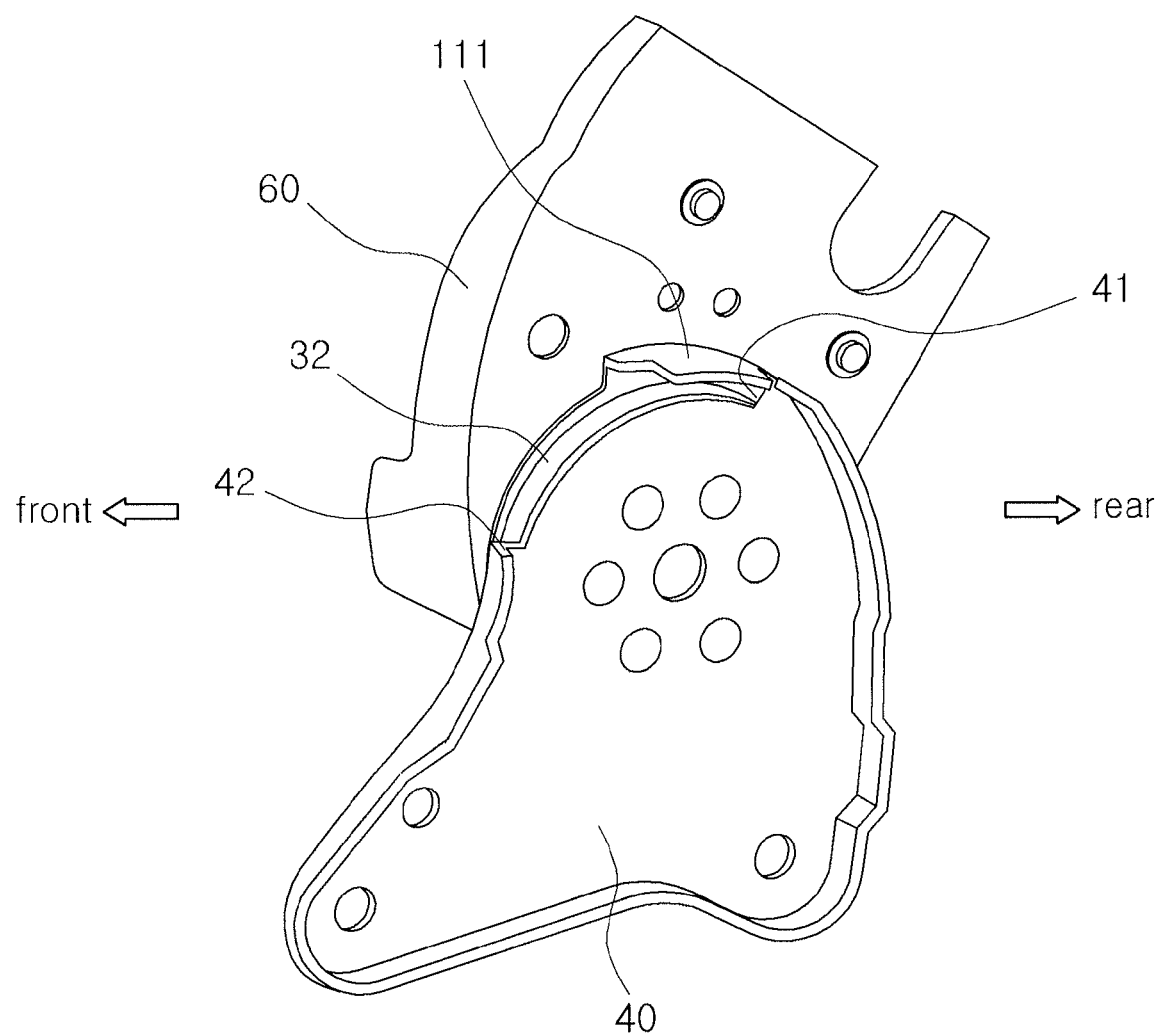
Figure 9:
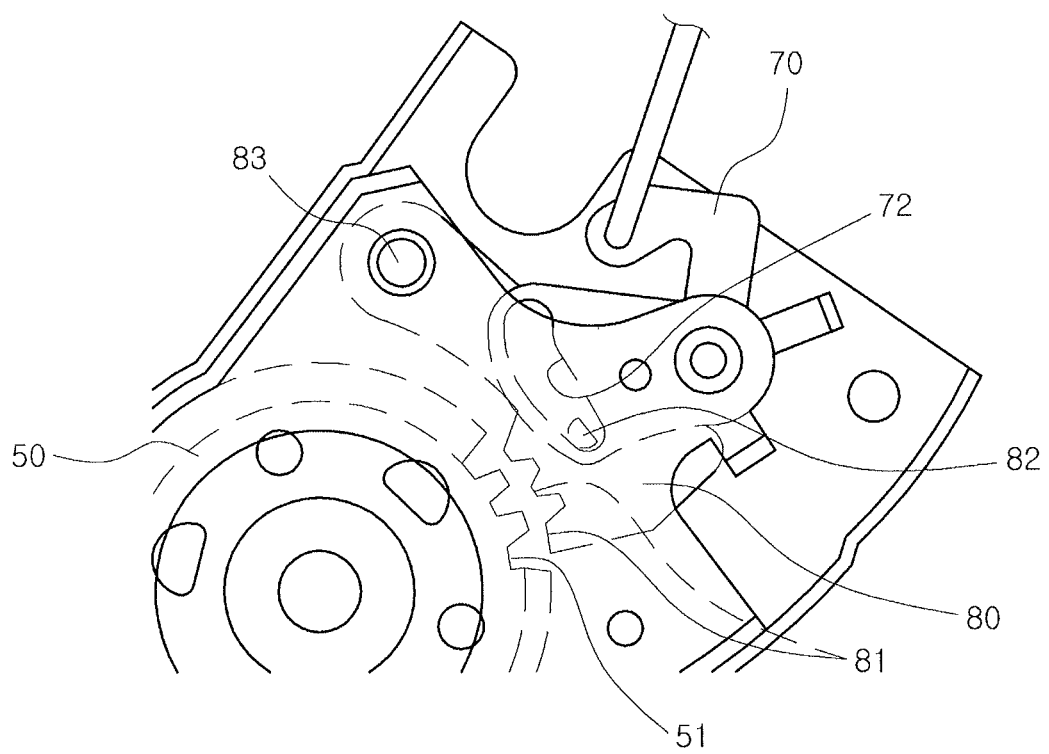

The operation slot 72 is formed in the link bracket 70 in a shape of an arc that extends in a circumferential direction around the rotating shaft 120. In detail, the curvature of the operation slot 72 is such that the length between the operation slot 72 and the rotating shaft 120 is gradually reduced from a first end of the operation slot 72 to a second end thereof. The position of the first end of the operation slot 72 is one at which the operation protrusion 82 is disposed when the tooth notches 51 engage with the locking lever protrusions 81, as shown in FIG. 4. The position of the second end of the operation slot 72 is one at which the operation protrusion 82 is disposed when the tooth notches 51 are released from the locking lever protrusions 81, as shown in FIG. 9.

Figure 13:
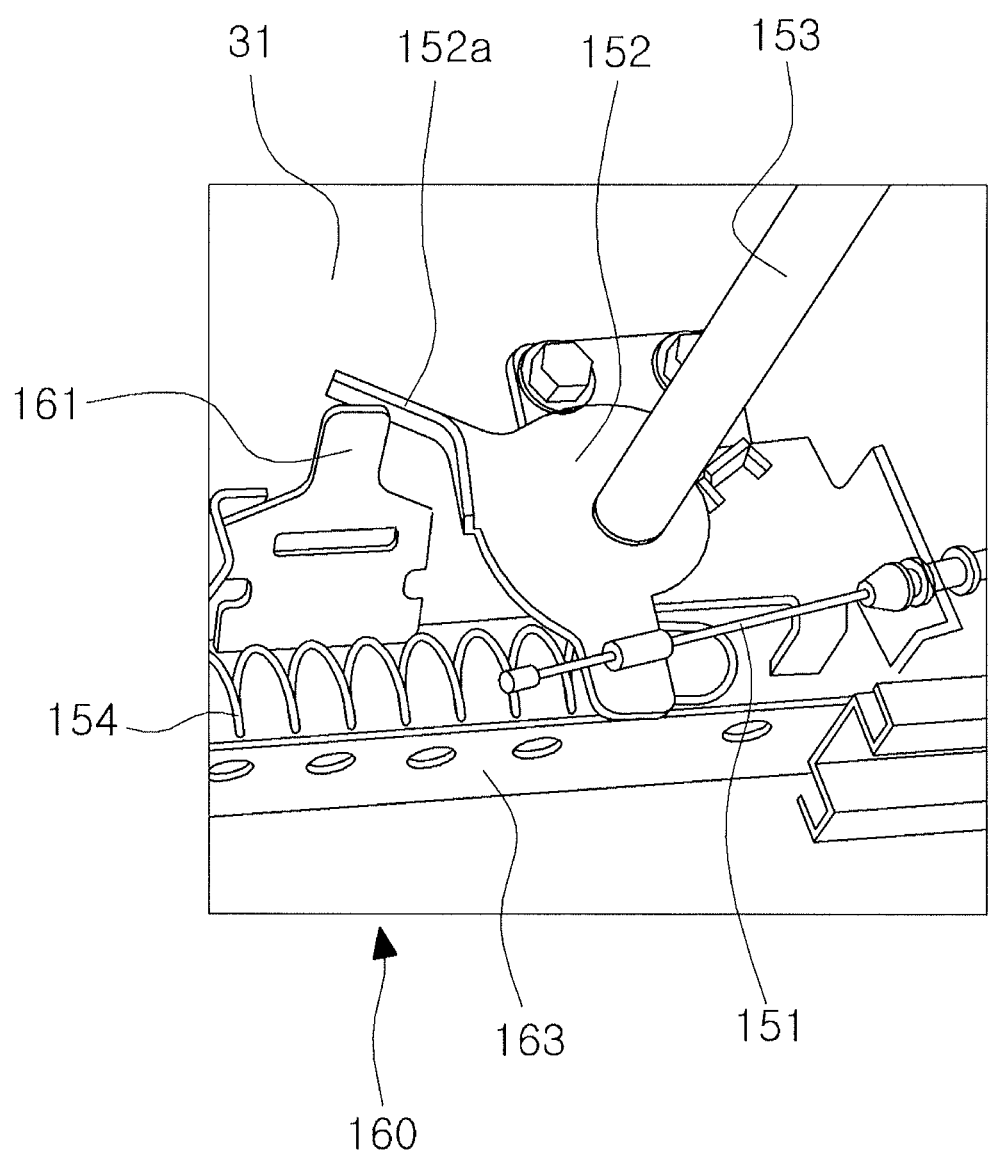

Meanwhile, as shown in FIG. 4, a first end of a walk-in cable 151 is connected to the seat back bracket 60. As shown in FIG. 13, a second end of the walk-in cable 151 is connected to a cable bracket 152. The cable bracket 152 is rotatably coupled to a cushion frame rod 153 provided on the seat cushion frame 31. A bracket rod 152a provided on the cable bracket 152 comes into contact with a lock bracket 161 provided on a seat rail 160. The seat rail 60 includes a movable rail 162 on which the lock bracket 161 is rotatably provided, and a stationary rail 163 which guides movement of the movable rail 162. Opposite ends of a walk-in spring 154 are respectively fastened to the movable rail 162 and the stationary rail 163.

Figure 14:
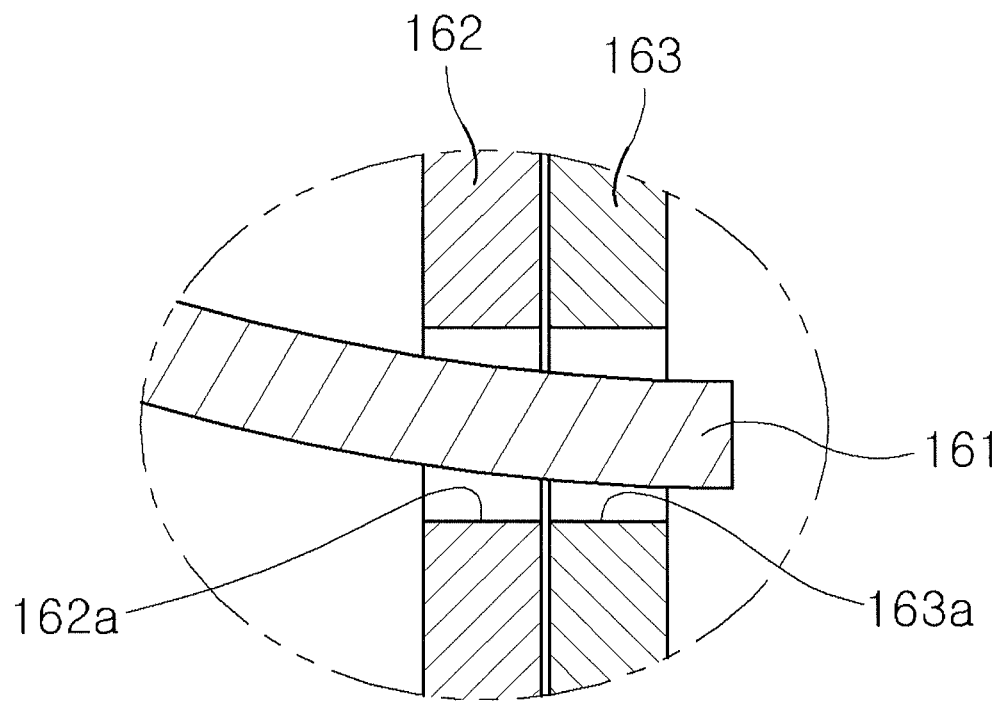
Figure 15:
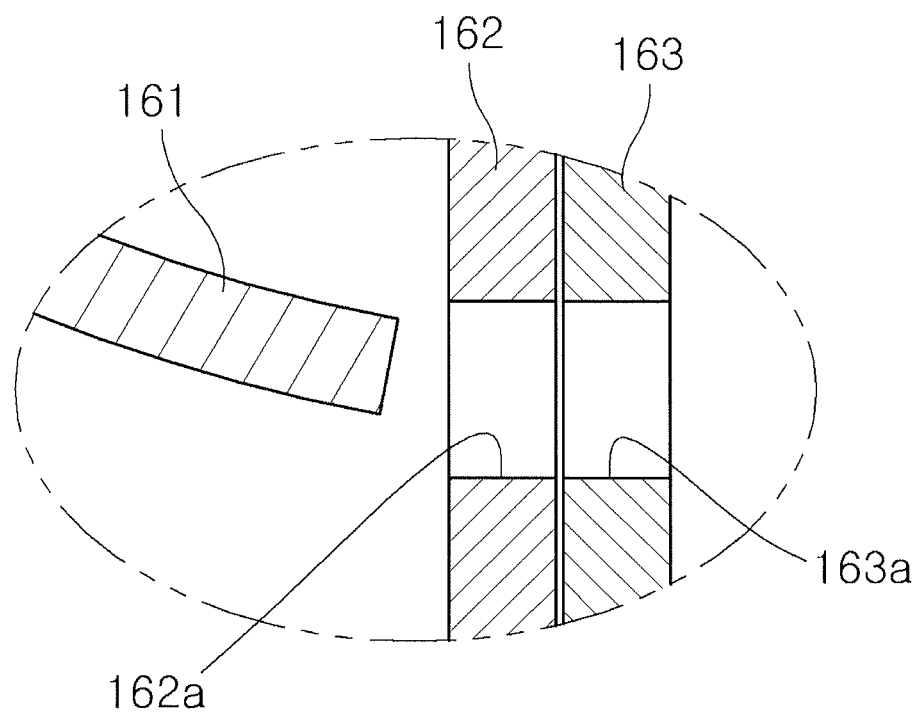

A plurality of locking holes 162a and a plurality of locking holes 163a are respectively formed in the movable rail 162 and the stationary rail 163 and arranged in the longitudinal direction (forward-backward direction) of the seat rail 160. As shown in FIG. 14, when the lock bracket 161 has been inserted into the locking holes 162a and 163a of the movable rail 162 and the stationary rail 163, the lock bracket 161 then restrains the movable rail 162 from moving along the stationary rail 163. As shown in FIG. 15, when the lock bracket 161 has been removed from the locking holes 162a and 163a of the movable rail 162 and the stationary rail 163, the movable rail 162 is allowed to move along the stationary rail 163.

Hereinafter, the operation of the walk-in apparatus according to the present invention will be explained.

Under the normal conditions in which the vehicle seat is not in the walk-in operation, as shown in FIG. 4, the locking lever protrusions 81 provided on the locking lever bracket 80 maintain the state of engagement with the tooth notches 51 formed in the holder tooth bracket 50. The seat back bracket 60 cannot rotate with respect to the seat cushion bracket 40.

In this case, the seat back frame 33 maintains the state in which it is placed upright with respect to the seat cushion frame 31, as shown in FIG. 3.

In the state of FIG. 3, when a vehicle passenger manipulates the walk-in lever 35 provided on the seat back 36, the lever cable 34 is pulled upwards from the state of FIG. 4, and the link bracket 70 is rotated in the clockwise direction around the rotating shaft 120.

Then, due to the structure of the operation slot 72, as shown in FIG. 9, as the operation protrusion 82 which is disposed in the operation slot 72 is pulled upwards, the locking lever bracket 80 rotates around a hinge pin 83 in the counterclockwise direction from the state of FIG. 4 to the state of FIG. 9.

As such, when the locking lever bracket 80 rotates, the locking lever protrusions 81 are removed from the tooth notches 51, as shown in FIG. 9. Since then, the seat back bracket 60 is allowed to rotate with respect to the seat cushion bracket 40.

Figure 10:
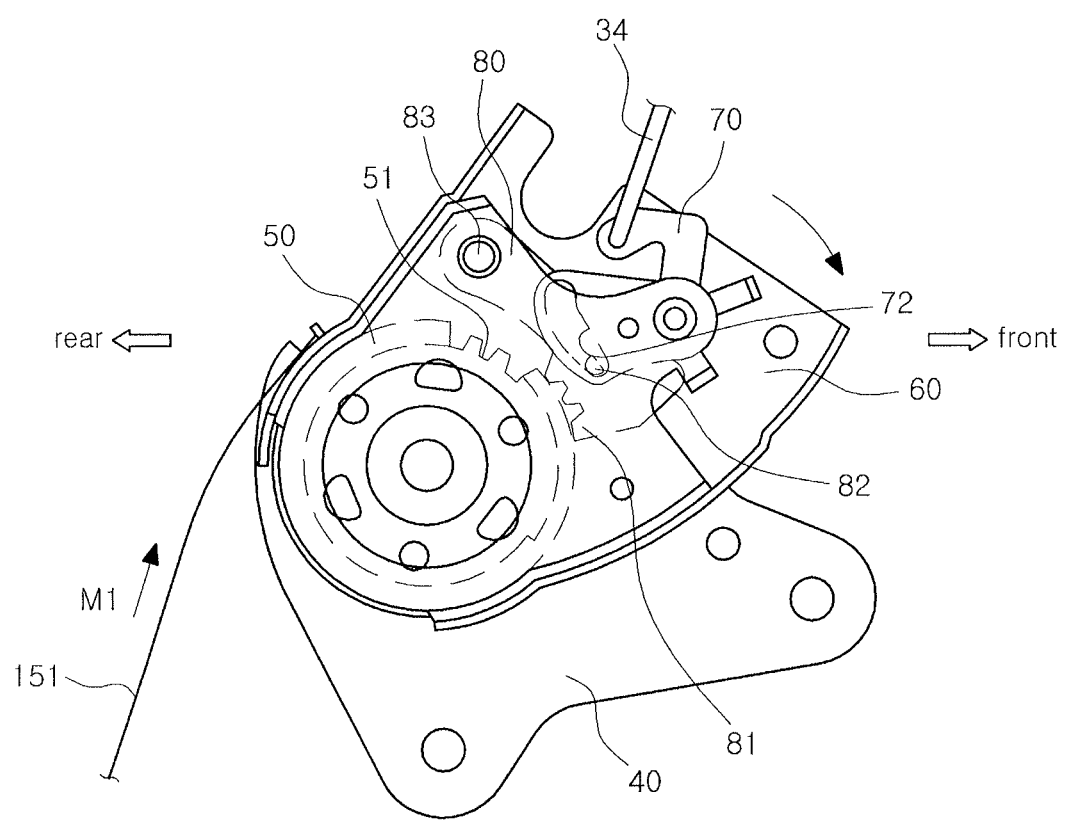
Figure 11:
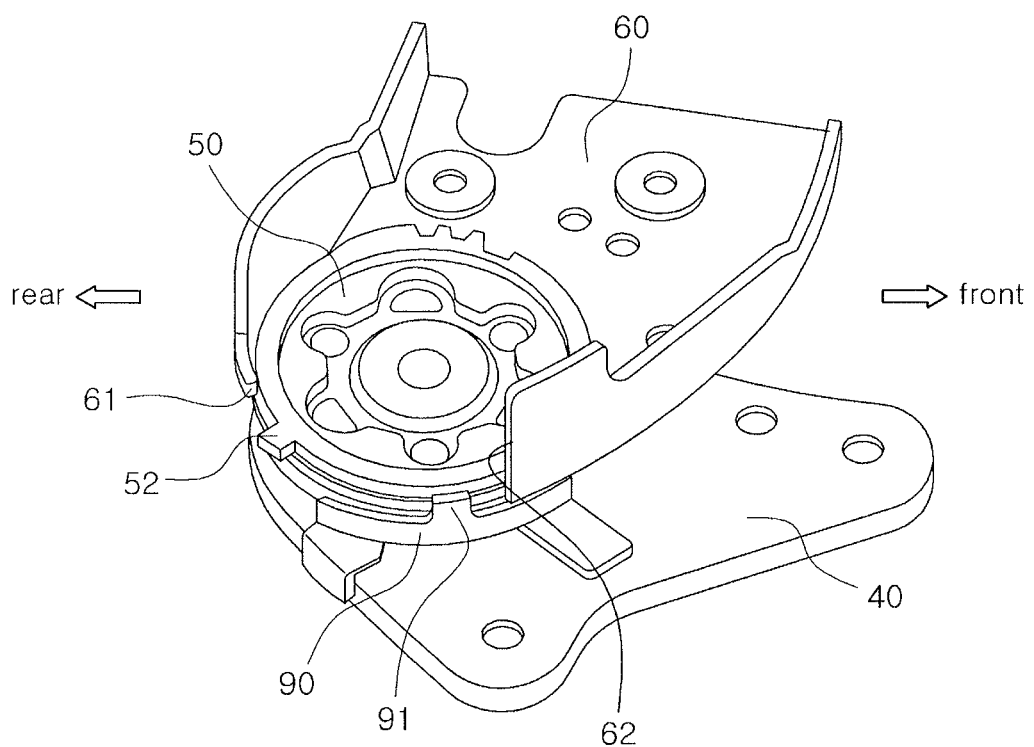
Figure 12:
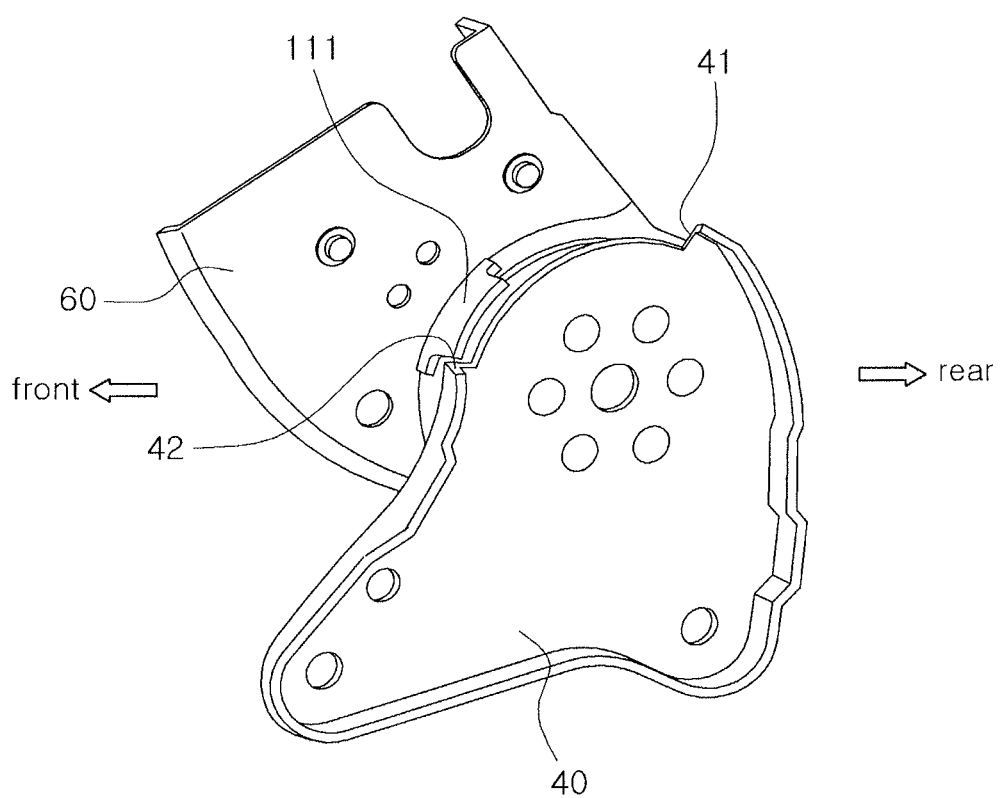

In the state of FIG. 9, when the user pushes the seat back 36 forwards, the seat back bracket 60 is rotated forwards and, simultaneously, the walk-in cable 151 is pulled in the direction designated by the arrow M1 of FIG. 10. Thereby, the cable bracket 152 which has been in the state of FIG. 13 is rotated in the counterclockwise direction.

The counterclockwise rotation of the cable bracket 152 from the state of FIG. 13 makes the bracket rod 152a push the lock bracket 161 downwards.

Meanwhile, when the bracket rod 152a is not pushing the lock bracket 161, as shown in FIG. 14, the lock bracket 161 maintains the state of having been disposed in the locking holes 162a and 163a of the movable rail 162 and the stationary rail 163. In this case, the lock bracket 161 maintains the state in which it restrains the movable rail 162 from moving along the stationary rail 163.

On the other hand, when the bracket rod 152a pushes the lock bracket 161 so that the lock bracket 161 is rotated, as shown in FIG. 15, the lock bracket 161 is removed from the locking holes 162a and 163a of the movable rail 162 and the stationary rail 163.

As shown in FIG. 15, when the lock bracket 161 is removed from the locking holes 162a and 163a of the movable rail 162 and the stationary rail 163, the movable rail 162 is moved in a sliding manner forwards along the stationary rail 163 by the pulling force of the walk-in spring 154. As a result, as shown in FIG. 16, the walk-in operation is conducted, in which the entire seat moves forwards after the seat back 36 has rotated forwards by a predetermined angle.

As described above, the walk-in apparatus according to the present invention can reliably embody the walk-in operation, despite the simple construction of the holder tooth bracket 50, the link bracket 70 and the locking lever bracket 80. Therefore, the present invention can reduce the number of parts, the weight and the production cost. Moreover, the present invention can reduce the volume of the entire apparatus so that it can be easily applied even to a small-sized seat, for example, in a small vehicle.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A walk-in apparatus for a vehicle seat, comprising:
a seat cushion bracket coupled to a seat cushion frame and a first surface of a recliner;
a holder tooth bracket coupled to a second surface of the recliner, with a tooth notch formed in a circumferential outer edge of the holder tooth bracket;
a seat back bracket having a first end rotatably disposed between the recliner and the holder tooth bracket, and having a second end coupled to a seat back frame;
a link bracket coupled to the seat back bracket so as to be elastically rotatable, the link bracket being connected to a walk-in lever by a lever cable;
a locking lever bracket rotatably coupled at a first end thereof to the seat back bracket, the locking lever bracket being connected at a second end thereof to the link bracket, with a locking lever protrusion integrally provided on a peripheral edge of the locking lever bracket, the locking lever protrusion engaging with the tooth notch;
a rotating shaft fastened to the seat back bracket, the rotating shaft passing through the link bracket so that the link bracket is able to rotate around the rotating shaft;
a holder bracket fastened to the seat back bracket such that the holder bracket overlaps the holder tooth bracket, with a holder protrusion integrally provided on the holder bracket; and
a link spring wrapped around the rotating shaft, the link spring being configured such that a first end thereof is supported on the link bracket and a second end thereof is supported on the holder protrusion so that an elastic restoring force is applied to the link bracket.

2. The walk-in apparatus as set forth in claim 1, wherein
a holder tooth protrusion integrally protrudes from the holder tooth bracket in a radial direction;
a first stopper bracket fastened to a first surface of the seat cushion bracket, the first stopper bracket including a first stopper protrusion protruding toward the seat back bracket; and a first restriction end and a second restriction end integrally provided on a peripheral edge of the seat back bracket, wherein the first restriction end contacts the holder tooth protrusion to restrain rearward rotation of the seat back bracket, and the second restriction end contacts the first stopper protrusion to restrain forward rotation of the seat back bracket.

3. The walk-in apparatus as set forth in claim 1, wherein
a second stopper bracket is provided between the seat cushion bracket and the seat back bracket, the second stopper bracket being integrally coupled to the seat back bracket and comprising a second stopper protrusion protruding toward the seat cushion bracket; and
a third restriction end and a fourth restriction end are integrally provided on a peripheral edge of the seat cushion bracket, wherein the third restriction end contacts the second stopper protrusion to restrain rearward rotation of the seat back bracket, and the fourth restriction end contacts the second stopper protrusion to restrain forward rotation of the seat back bracket.

4. The walk-in apparatus as set forth in claim 1, wherein the link bracket includes:
a shaft hole through which the rotating shaft passes;
and an operation slot in which an operation protrusion provided on the locking lever bracket is disposed, and
a cable coupling protrusion and a spring coupling protrusion are integrally provided on the link bracket around the shaft hole, wherein a first end of the lever cable is coupled to the cable coupling protrusion, and the first end of the link spring is caught and supported by the spring coupling protrusion.

5. The walk-in apparatus as set forth in claim 4, wherein
the operation slot is formed in a shape of an arc that extends in a circumferential direction around the rotating shaft, and
the operation slot has a curvature such that a length between the operation slot and the rotating shaft is reduced from a first end of the operation slot to a second end thereof, wherein the operation protrusion is disposed at the first end of the operation slot when the tooth notch engages with the locking lever protrusion, and the operation protrusion is disposed at the second end of the operation slot when the tooth notch is released from the locking lever protrusion.

6. The walk-in apparatus as set forth in claim 1, wherein
a walk-in cable is connected at a first end thereof to the seat back bracket;
a cable bracket is connected to a second end of the walk-in cable;
the cable bracket is rotatably coupled to a cushion frame rod provided on the seat cushion frame;
a bracket rod is provided on the cable bracket, the bracket rod coming into contact with a lock bracket provided on a seat rail;
the seat rail comprises: a movable rail on which the lock bracket is rotatably provided; and a stationary rail guiding movement of the movable rail; and
a walk-in spring is fastened at opposite ends thereof to the movable rail and the stationary rail.

* * * * *